(12) United States Patent
Sanders (10) Patent No.: US 9,995,568 B2
(45) Date of Patent: Jun. 12, 2018

(54) CONSTRUCTION SITE MONITORING SYSTEM

(71) Applicant: Mark E. Sanders, Zionsville, IN (US)

(72) Inventor: Mark E. Sanders, Zionsville, IN (US)

(*) Notice: Subject to any disclaimer, the term of this patent is extended or adjusted under 35 U.S.C. 154(b) by 126 days.

(21) Appl. No.: 15/287,157

(22) Filed: Oct. 6, 2016

(65) Prior Publication Data

US 2017/0097227 A1   Apr. 6, 2017

Related U.S. Application Data

(60) Provisional application No. 62/237,636, filed on Oct. 6, 2015.

(51) Int. Cl.

| | |
|---|---|
| *G01C 11/02* | (2006.01) |
| *G01S 17/10* | (2006.01) |
| *G01S 17/42* | (2006.01) |
| *G01S 17/88* | (2006.01) |
| *G01B 11/06* | (2006.01) |
| *H04N 7/18* | (2006.01) |
| *G01S 17/89* | (2006.01) |
| *G06Q 30/00* | (2012.01) |
| *G06Q 50/08* | (2012.01) |
| *G01S 7/00* | (2006.01) |
| *E02D 29/02* | (2006.01) |
| *G01S 17/02* | (2006.01) |
| *G01S 17/66* | (2006.01) |

(52) U.S. Cl.
CPC .......... *G01B 11/0608* (2013.01); *G01C 11/02* (2013.01); *G01S 7/003* (2013.01); *G01S 17/10* (2013.01); *G01S 17/42* (2013.01); *G01S 17/88* (2013.01); *G01S 17/89* (2013.01); *G06Q 30/018* (2013.01); *G06Q 50/08* (2013.01); *H04N 7/183* (2013.01); *E02D 29/0241* (2013.01); *E02D 2600/10* (2013.01); *G01S 17/023* (2013.01); *G01S 17/66* (2013.01)

(58) Field of Classification Search
CPC .......... G01S 13/04; G01S 17/10; G01S 17/42; G01S 17/88; G01B 1/0608; G01C 11/02
See application file for complete search history.

(56) References Cited

U.S. PATENT DOCUMENTS

| | | | | |
|---|---|---|---|---|
| 5,826,808 A | * | 10/1998 | Giovanardi | ............ A01B 27/00 |
| | | | | 241/27 |
| 2014/0036085 A1 | * | 2/2014 | Avignon | ................. G01S 13/04 |
| | | | | 348/153 |
| 2017/0083732 A1 | * | 3/2017 | Handshaw | .......... G06K 7/10881 |

* cited by examiner

*Primary Examiner* — Obafemi Sosanya
(74) *Attorney, Agent, or Firm* — Maginot, Moore & Beck, LLP (57) ABSTRACT

A job site monitoring system includes a tower-mounted scanner that is situated to monitor all or substantially all of a particular construction site. The scanner is configured to provide data to a processor configured to determine the height of fill material deposited at a job site. The processor is adapted to communicate with a remote client who can review the data collected at the job site. The processor may also be configured to compare the live fill height data to predetermined parameters to determine whether an error condition exists. An alert may be issued upon detection of such an error to enable corrective action to be taken before construction continues at the site.

9 Claims, 10 Drawing Sheets

CONSTRUCTION SITE MONITORING SYSTEM

PRIORITY CLAIM

This application is a utility filing from and claims priority to co-pending U.S. provisional application No. 62/237,636, filed on Oct. 6, 2015, the entire disclosure of which is incorporated herein.

BACKGROUND

The present disclosure relates to construction sites, ranging from the construction of mechanically stabilized (MSE) systems to road construction to commercial or residential building construction. Most construction sites involve several sub-contractors who report to a general contractor who bears overall responsibility for the completion of the construction project. While the general contractor continuously monitors the activities and work product of the sub-contractors, it is still difficult to find all the errors, accidental or deliberate, that can occur. In particular, it is often difficult to ensure that every aspect of a construction job is performed according to the specifications and plans for the job. The problem is particularly difficult when the general contractor is faced with sub-contractors trying to short-cut the process.

Figure 1:
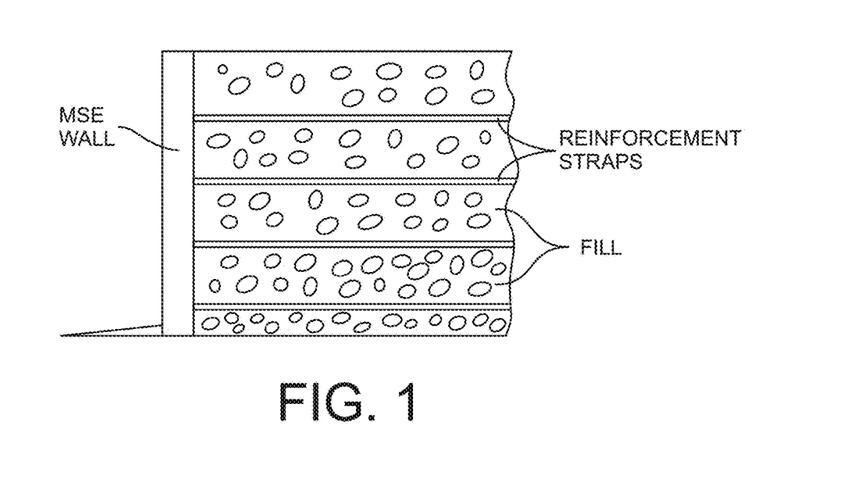
FIG. 1 is representation of an MSE wall system.

FIG. 1 depicts a typical MSE wall installation which includes a plurality of reinforcement straps projecting into several levels of reinforced fill. In the typical MSE construction, each layer of back fill must be compacted to a predetermined thickness in order to ensure the proper structural integrity to both support the MSE wall and anchor the reinforcement straps. Improper compaction can lead to a loose back fill that is unable to prevent movement of the reinforcement straps. Eventually the reinforcement straps can work loose in the back fill with the potential of a catastrophic failure of the MSE wall.

In the typical MSE job site, each layer of fill is dumped at the site at a depth of fill or backfill height", which is the height of the loose fill material after it has been leveled but before compaction. Many regulations, such as promulgated by state or federal departments of transportation, require the backfill height to be no more than 12 inches. The backfill is then compacted to another regulated height, typically 8 inches. Once one layer of backfill has been fully compacted, the next layer is dumped and graded, and the compaction process is repeated. The reinforcement straps are added at particular layers.

The leading causes of failures of MSE walls are:
poor geometry
poor or inadequate backfill placement
poor or inadequate compaction
inexperienced installation contractors.

Most regulatory agencies have inspectors that monitor all MSE construction sites, but the inspectors cannot be everywhere at all times. Poor backfill processes are not necessarily easily detected by visual inspection of the site throughout the construction process. In spite of diligent inspections MSE wall systems can fail due to poor construction.

Consequently, there is a need for a system that can continuously monitor a construction job site to spot errors interactively. Such a system could be used to stop the improper construction in god time to effect remedial treatment of the job site. This will avoid hidden defects that come to light much later after the construction is complete. Such a system would also catch poor construction early enough in the process so that remediation is relative simple and inexpensive.

SUMMARY

A job site monitoring system includes a tower-mounted scanner that is situated to monitor all or substantially all of a particular construction site. The scanner is configured to provide data to a processor configured to determine the height of fill material deposited at a job site. The processor is adapted to communicate with a remote client who can review the data collected at the job site. The processor may also be configured to compare the live fill height data to predetermined parameters to determine whether an error condition exists. An alert may be issued upon detection of such an error to enable corrective action to be taken before construction continues at the site.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Figure 2:
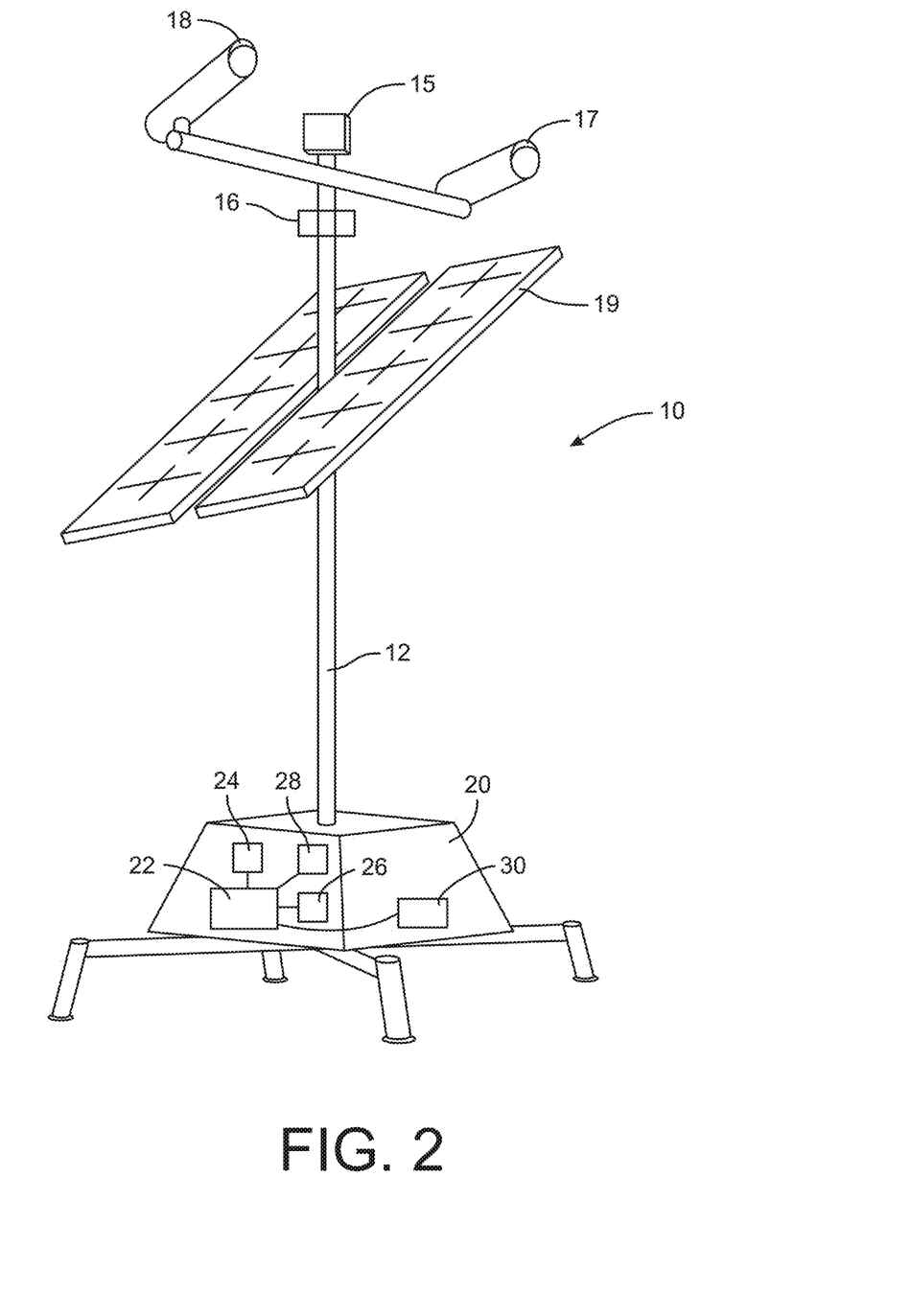
FIG. 2 shows one component of the job site monitoring system of the present disclosure.
Figure 3:
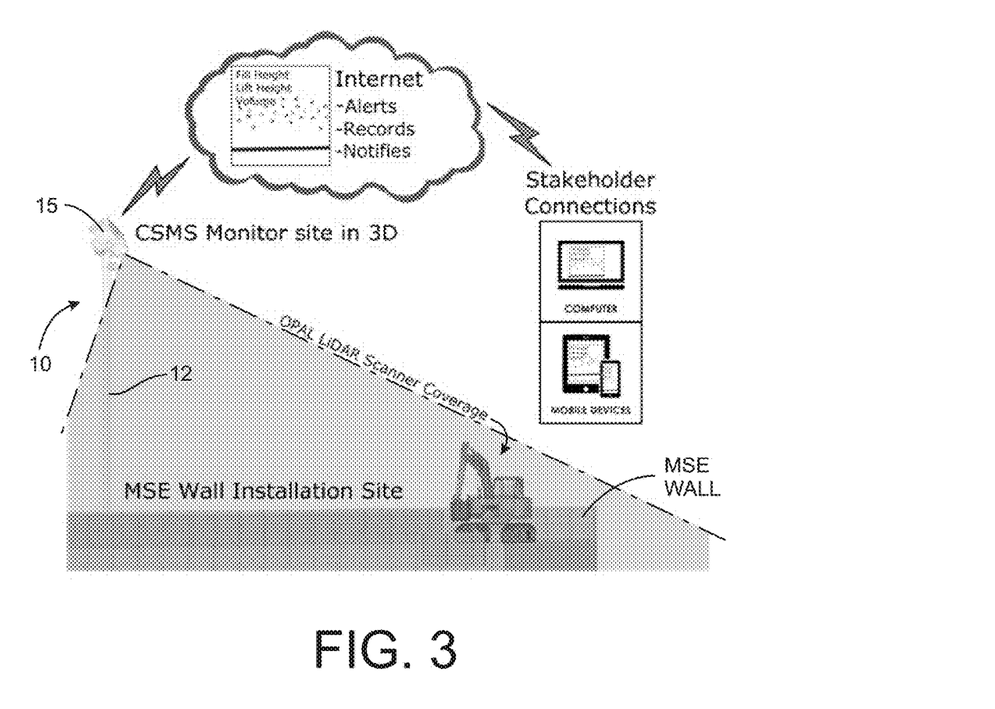
FIG. 3 is a diagram showing the component of FIG. 2 used at a construction job site.

The job site monitoring system of the present disclosure utilizes one or more site monitoring subsystems 10 shown in FIG. 2. the sub-system includes a mobile tower 12 that supports a scanner 15. The tower is configured to be placed at a job site with the scanner 15 elevated high enough to survey the entirety of or some portion of the job site. Thus, as depicted in FIG. 3, the scanner 15 is elevated at a height, such as 100 ft., and positioned so that a 3-D beam transmitted by the scanner can provide coverage of a large area. The subsystem may further include a GPS antenna 16 that can be used to establish the location of the subsystem 10 in global coordinates. A light 17 and a security camera 18 may also be supported on the tower 12 and arranged so that the field of view of the camera coincides with the scan pattern of the scanner 15 so that all three components are surveying the same region of the job site. The camera field of view is preferably large enough to entirely encompass the scanned region of the job site.

The subsystem may incorporate solar panels 19 mounted on the tower to provide power to at least the four components 15, 16, 17, 18 mounted at the top of the tower. The solar panels may also provide power to the control module 20 situated at the base of the tower. The control module includes a processor 22 that can communicate with the four components 15, 16, 17, 18 at the top of the tower. The components may thus be wired directly to the processor 22 or may communicate via a wireless communication module 28, which can be a Bluetooth module or module capable of wireless communication between nearby components.

The control module 20 may further include a cellular modem 24 adapted for cellular communication to a telephone system, and a WiFi modem 26 or other IEEE 802.11 standard transmitter capable of wireless connection to a remote network, such as the Internet or the "Cloud". The processor may thus be configured for cloud computing as a means to provide remote access to data generated by the subsystem 10 at a job site. The control module 20 may include its own power supply 30 that may be provided in lieu of or in addition to the solar panels to provide power to the processor and/or the tower mounted components.

The subsystem 10 is configured to operate continuously, at least during working hours at the job site. The scanner 15 and security camera 18 are thus configured to continuously transmit signals to the processor 22 indicative of the data generated by the component. For instance, the security camera transmit video images to the processor, and preferably digital video images that can be readily stored and accessed, either on the processor, or on a remote storage medium, or in the Cloud.

The heart of the subsystem 10 is the scanner 15. The scanner is configured to accurately determine the geometry of the features at the job site. For instance, the scanner can generate digital 3-D data concerning the geometry of the MSE wall that can be used to verify that the MSE wall is being properly constructed according to the job site blueprints. Perhaps more importantly, the scanner can generate data indicative of the height of fill added to the job site. This height data can be used to calculate the backfill height as well as the compaction height which data can then be compared to the job site specifications, such as dictated by DOT regulations. The scanner may also be configured to generate data indicative of the material being scanned.

In one embodiment, the scanner is an OPAL™ 3D laser scanner or LIDAR (light detection and ranging) device, sold by Neptec Technologies Group. The OPAL™ 3D LIDAR incorporates obscurant-penetrating technology and is designed to operate in harsh environments where the scanner may be subjected to significant amounts of dust, vibration, shock, and wide operating temperature ranges. The OPAL™ sensor uses a 1540 nm pulsed laser and a fast canning Risley prism design to produce up to 200,000 points-per-second data acquisition. The scan pattern or the laser avoids data gaps so that the entire job site can be accurately scanned. The scanner 15 generates digital data points for a 3D representation of the job site based on the reflected laser beam across the scan pattern. The digital data can be manipulated by the processor 22 or remotely to focus on specific areas of the job site, such as a particular backfill operation at the job site. This 3D digital data allows a client to extract relevant information automatically and interactively as the work progresses at the job site. For instance, the 3D data generated by the OPAL™ scanner can be used to calculate backfill height per lift and compacted height by comparing the current height of the fill to a previously acquired height of the fill. Once it is calibrated, the scanner 15 can determine height of objects, such as back fill, based on the differential timing of the reflected laser beam relative to the calibrated or baseline timing.

It can be appreciated that since the data acquisition process is continuous, the data obtained at any particular time may not be indicative of the true backfill height or compacted height. For instance, when the backfill is initially introduced to the job site it will necessarily be mounded. The backfill height at this point in time would necessarily be outside specifications. During the construction process this mound of backfill is graded and leveled to the true backfill height. The processor can evaluate the trends in the backfill height for a given lift and determine when the change in backfill height over some time unit is essentially zero. The same process can be used to ensure an accurate compacted height. Thus, in one embodiment, the processor 22 is operable to evaluate the incremental change in measured height and establish a stable, or substantially uniform or unchanging height value when the incremental change is zero or within a small tolerance.

The OPAL™ scanner and associated 3D processing software can also be configured for object recognition and tracking. The processor may thus be loaded with object parameters representative of objects normally encountered at a construction job site, such as earth moving equipment and workers. The scanner may thus determine that the backfill is being graded and leveled upon detection of a grader at the job site. Once the grader leaves the area under surveillance the processor can determine that the grading process is complete and measure a true backfill height. A similar process can be used to determine the true compacted height. The processor 22 may also be configured to determine the reflectivity of the material being scanned and ascertain the material composition based on that reflectivity. In particular, certain materials may scatter the laser beam so that the reflected beam is of much lower intensity than the original scanning beam. The degree of reflected intensity can be correlated to materials typically found at a job site, such as aggregate, dirt, concrete and steel.

As depicted in FIG. 3, the scanner 15 of subsystem 10 scans the job site in which an MSE wall construction is occurring. The processor 22 of the subsystem receives the 3D data from the scanner and executes software instructions operable to process the data to generate the desired information. This information is then transmitted view cellular or WiFi to the computers or handheld devices of one or more clients or stakeholders. The client(s) can then take appropriate action. For instance, if the client is a general contractor, the contractor can contact the site supervisor to notify him/her of a problem in the construction, such as an inadequate backfill or compaction. A DOT inspector might take similar action and then evaluate later data from the subsystem 10 to verify that remedial action has been taken. Alternatively, the client might be the subcontractor task with constructing the MSE wall. The data acquired from the subsystem 10 might be used to verify that the construction was according to specifications. The subcontractor might also use the data to gauge the performance of a particular crew.

Figure 4:
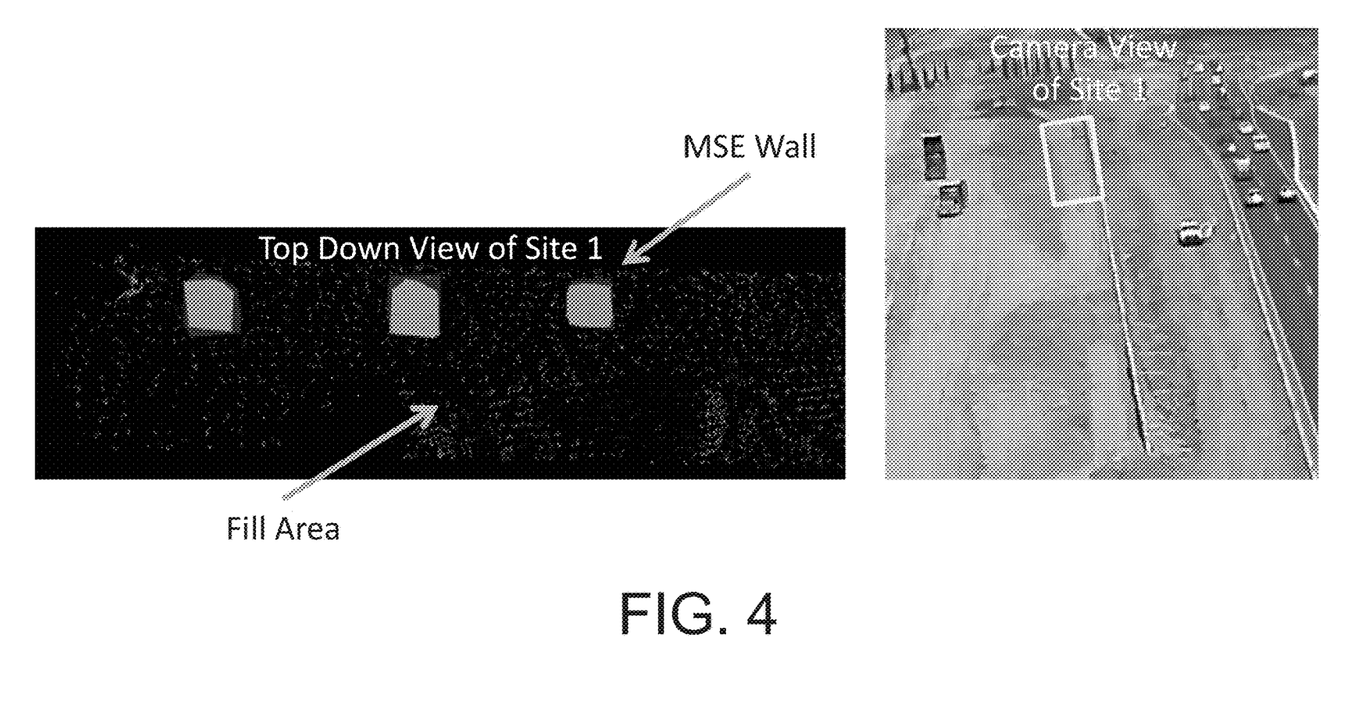
FIG. 4 depicts displays provided by the processor of the component shown in FIG. 2, with one display showing a digital representation of the job site and a second display showing a camera view of the job site.
Figure 5:
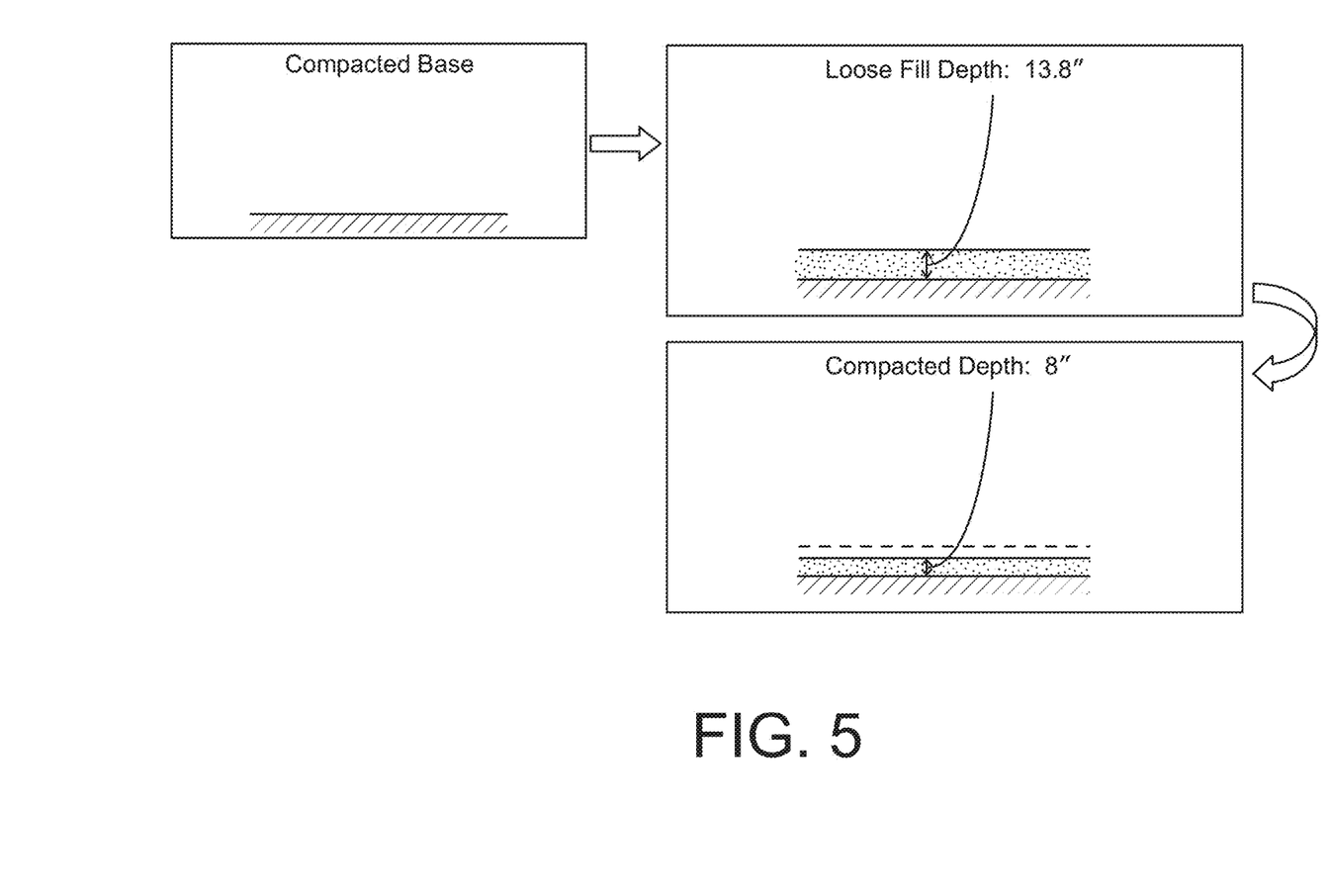
FIG. 5 is a graphical representation generated by the processor of the component of FIG. 2 showing three stages in the backfill process for the hob site.

The processor 22 can acquire the information from the scanner 15 and the camera 18 to provide images to the client as shown in FIG. 4. The left image is the digital representation of the job site acquired by the scanner 15, while the camera view is shown in the image at the right. These same images can be manipulated by a client to focus on an area of interest as denoted by a rectangle superimposed on the camera view image. The processor can execute software instructions that allow the client to identify the area of interest and then display the 3D scanner data corresponding to that area of interest. The processor can provide the client with further images identifying the stages in the backfill operation, as shown in the images of FIG. 5. The initial image can show the baseline for a fill height calculation, namely the existing compacted base on which a new layer of backfill is to be added. The second image in the sequence shows the graded height of the loose fill with the depth calculation obtained by comparing the 3D height of the compacted base with the 3D scanned height of the loose fill. The difference is the depth which can be displayed with the loose fill image. The third image shows the fill depth after compaction, generated by comparing the 3D scanned height of the compacted fill to the baseline 3D height of the compacted base. These images provide an immediate visual representation of the backfill operation at a particular location within the job site.

Figure 6:
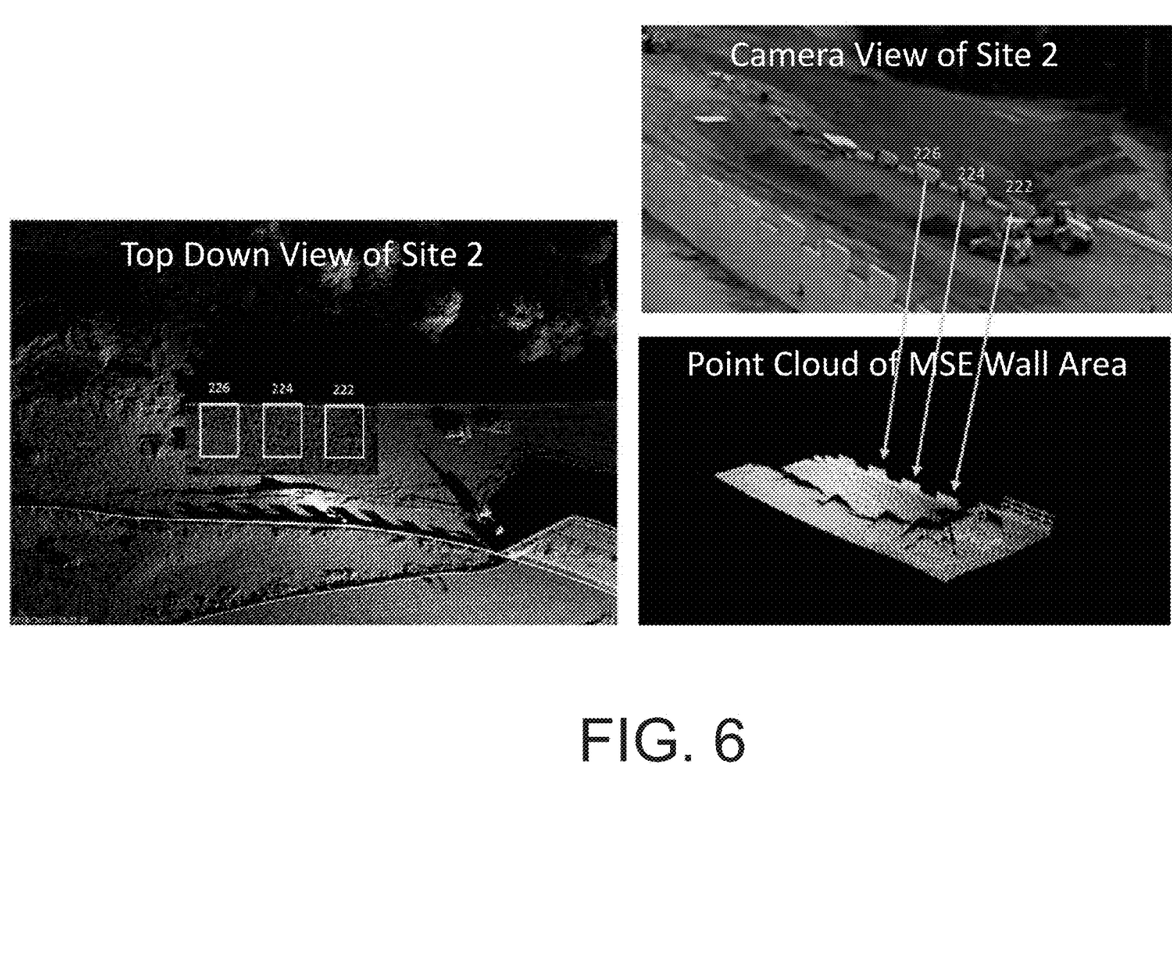
FIG. 6 is a display generated by the processor of the component shown in FIG. 2 in which one view is a camera view of the job site, another view is a top down view of the site and a third view is a digital representation of area(s) of interest at the job site.

FIG. 6 shows another collection of images that can be generated from the 3D scanner data and camera image data. In these images the entire job site is shown with particular areas of interest identified and labeled and then correlated to the digital image stored in the Cloud. The stored digital image can provide a graphic representation of fill height throughout the job site, including at the three identified areas to provide an immediate visual indication of any problem areas. In this particular image in FIG. 6, the backfill associated with the region labeled "222" can be colored in shades of red representing deviation from the backfill specifications.

Figure 7:
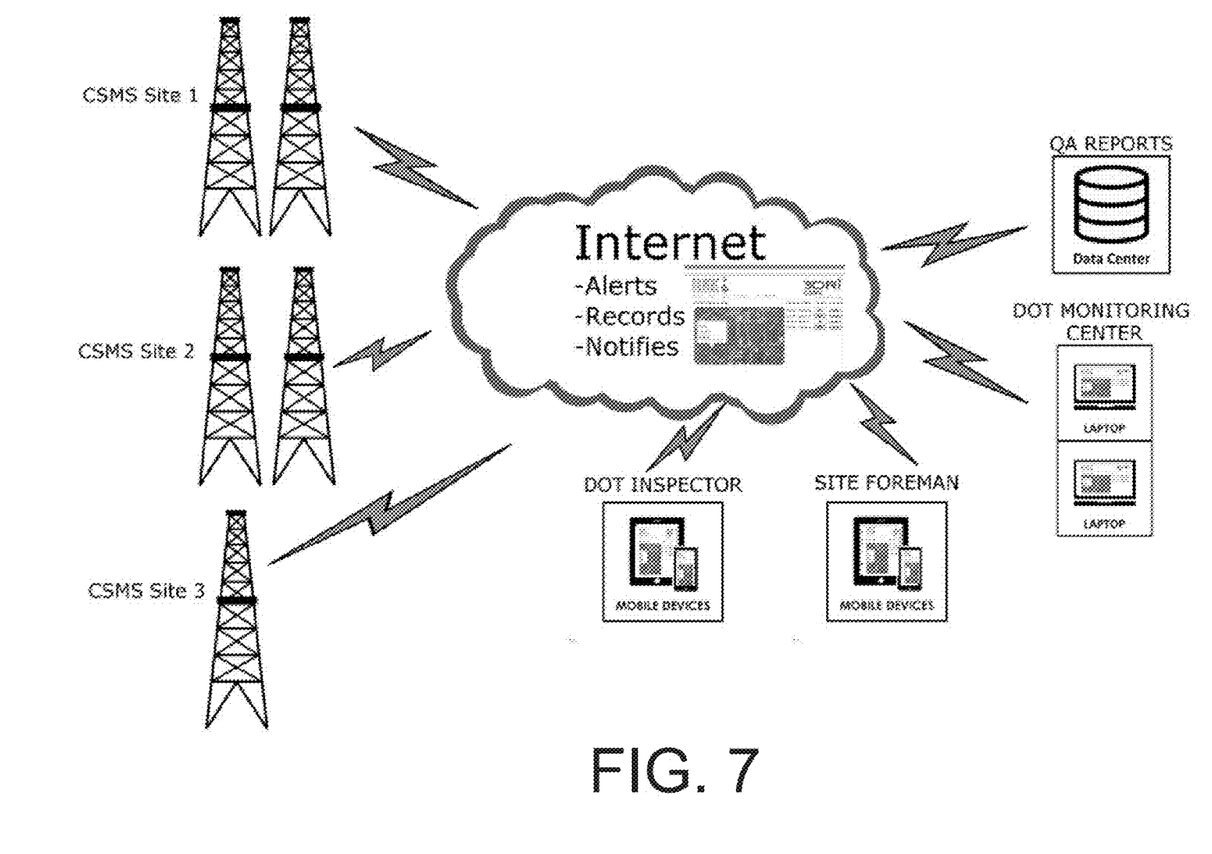
FIG. 7 is diagram of a network of job site monitoring systems for access by a client or clients.
Figure 8:
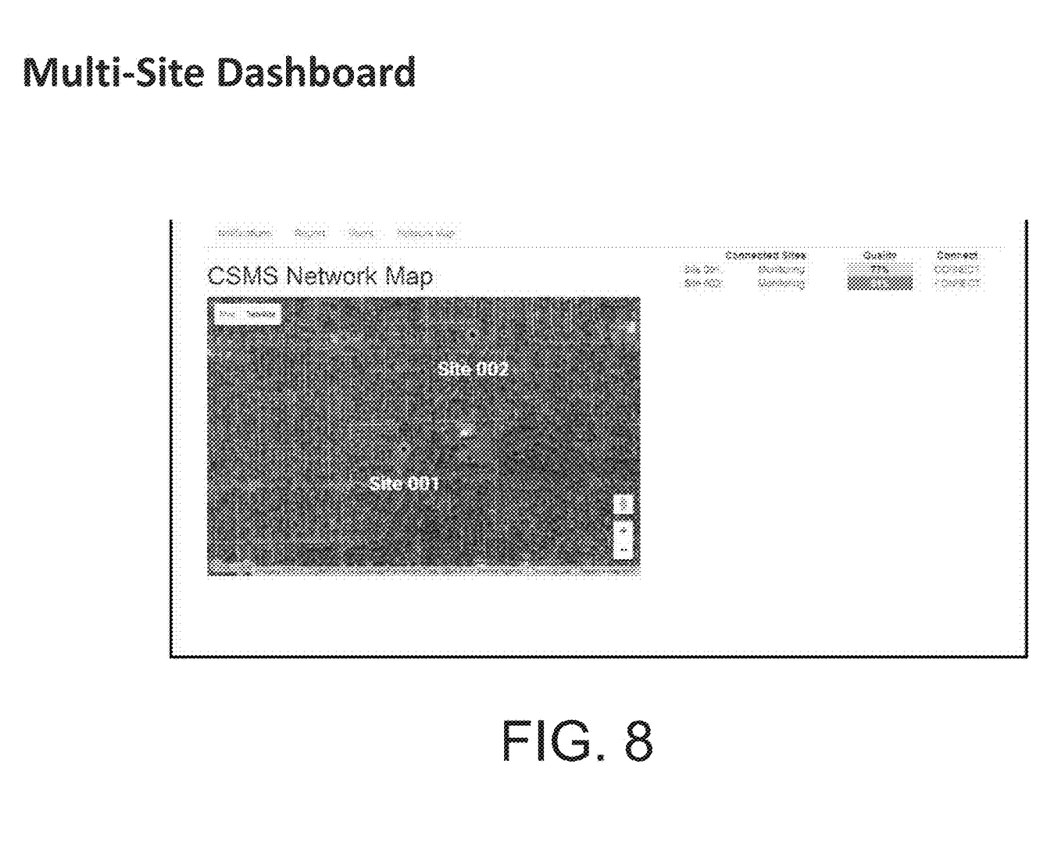
FIG. 8 is a depiction of a dashboard display for the network shown in FIG. 7 generated by the job site monitoring system according to one feature of the present disclosure.
Figure 9:
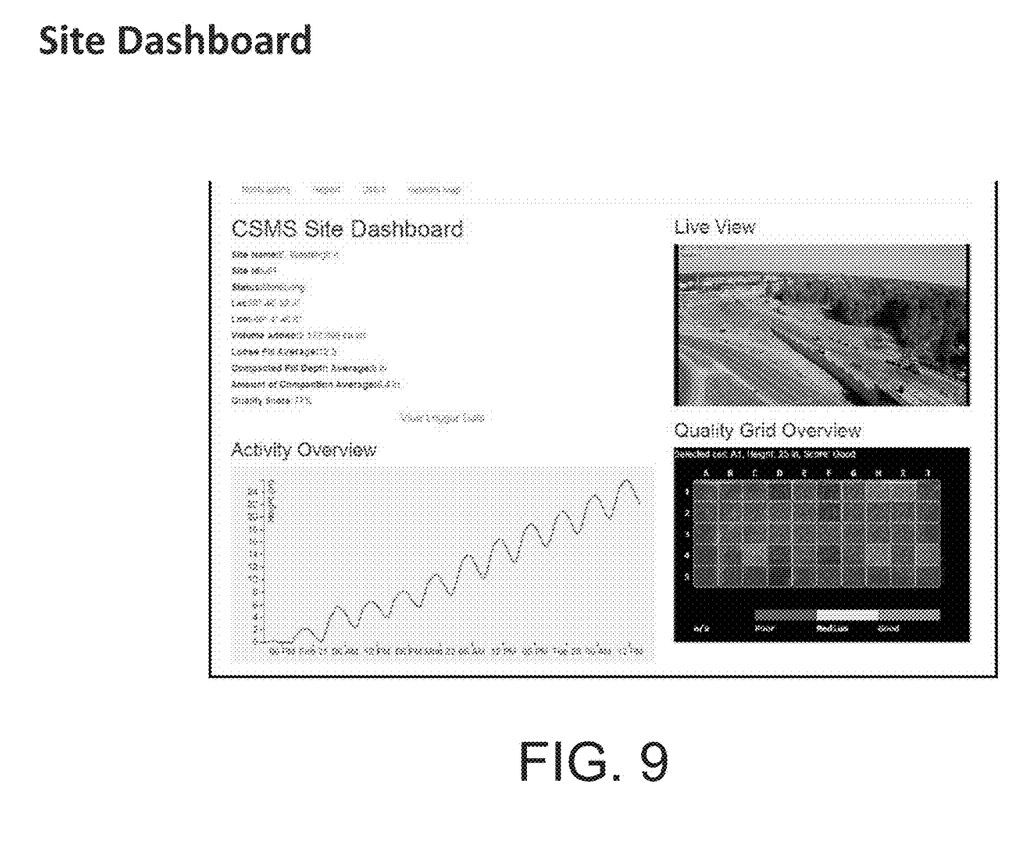
FIG. 9 is a depiction of a dashboard display of data for a single one of the job sites in the network depicted in FIGS. 7 and 8.

The construction site monitoring system of the present disclosure contemplates a network of multiple job sites being monitored by a particular client. In the example of FIG. 7, three job sites are being remotely monitored by a DOT inspector and by a site foreman via their respective mobile devices. The mobile devices implement an app that allows them to view the data generated by the processor 22 and stored in the "Cloud". A third client can access the Cloud-based data from a fixed station at a DOT monitoring center where specific quality assurance and inspection reports can be generated. The mobile app and the fixed location computer can operate a multi-site dashboard that provides the client with immediate and comprehensive access to the data generated by the subsystem 10 at each of the networked job sites. Thus, in FIG. 8 a first page of the dashboard can be a map showing the location of the networked job sites. This dashboard page can display a quality figure indicative of the ratio of out-of-spec backfill operations to in-spec operations. Any of the monitored job sites can be selected for more detailed review in a CSMS Site dashboard shown in FIG. 9. This dashboard page provides data summaries of the backfill activity in the graph at the lower left and a quality overview in the grid map in the lower right. The "Activity Overview" shows the backfill height as it progress over the construction process. The oscillations represent the addition of loose fill followed by compaction, followed by the addition of more loose fill, etc., until the final compaction is completed. Uniform peaks and valleys are generally indicative of good backfill practices. In the example shown in FIG. 9, the backfills occurring between 6 am on February 21 and 6 am on February 22 appear to have a substandard loose fill height and possibly inadequate compaction. The "Quality Grid Overview" chart provides a clear indication of the substandard fill locations within the job site. The data is summarized in the upper left of the Site Dashboard, where it can be seen that the total volume of backfill added to the job site is displayed, which can provide another measure of the overall quality of the backfill operation.

Figure 10:
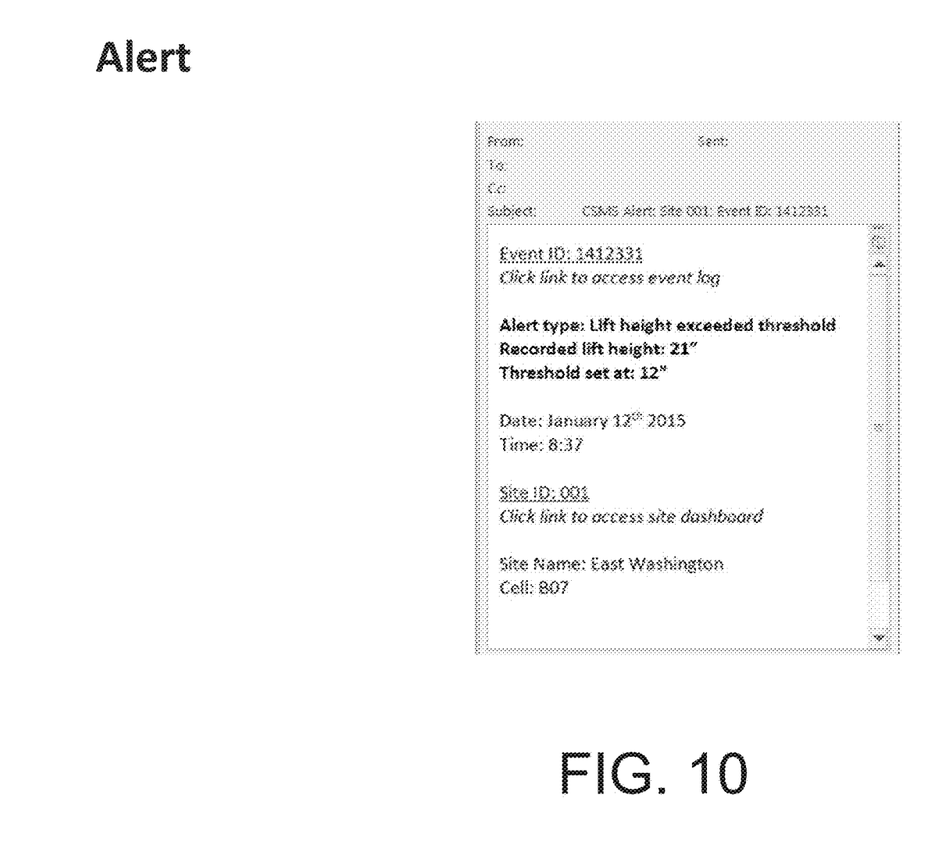
FIG. 10 is depiction of an alert message generated by the job site monitoring system of the present disclosure.

The processor 22 of the subsystem 10 is also configured to generate alerts that can be transmitted as a cellular text transmission to the portable devices of the clients. The processor is continuously monitoring the job site and comparing the detected fill data to the specifications. Any deviation from spec results in the generation of an alert providing the details of the alert condition. In the example in FIG. 10, the alert indicates that the lift height or the height of the loose fill immediately prior to compaction exceeded the threshold by a significant amount. Upon receipt of this alert, the client can immediately contact the site supervisor to require remediation, usually in the form of removing and redepositing the loose fill.

Figure 11:
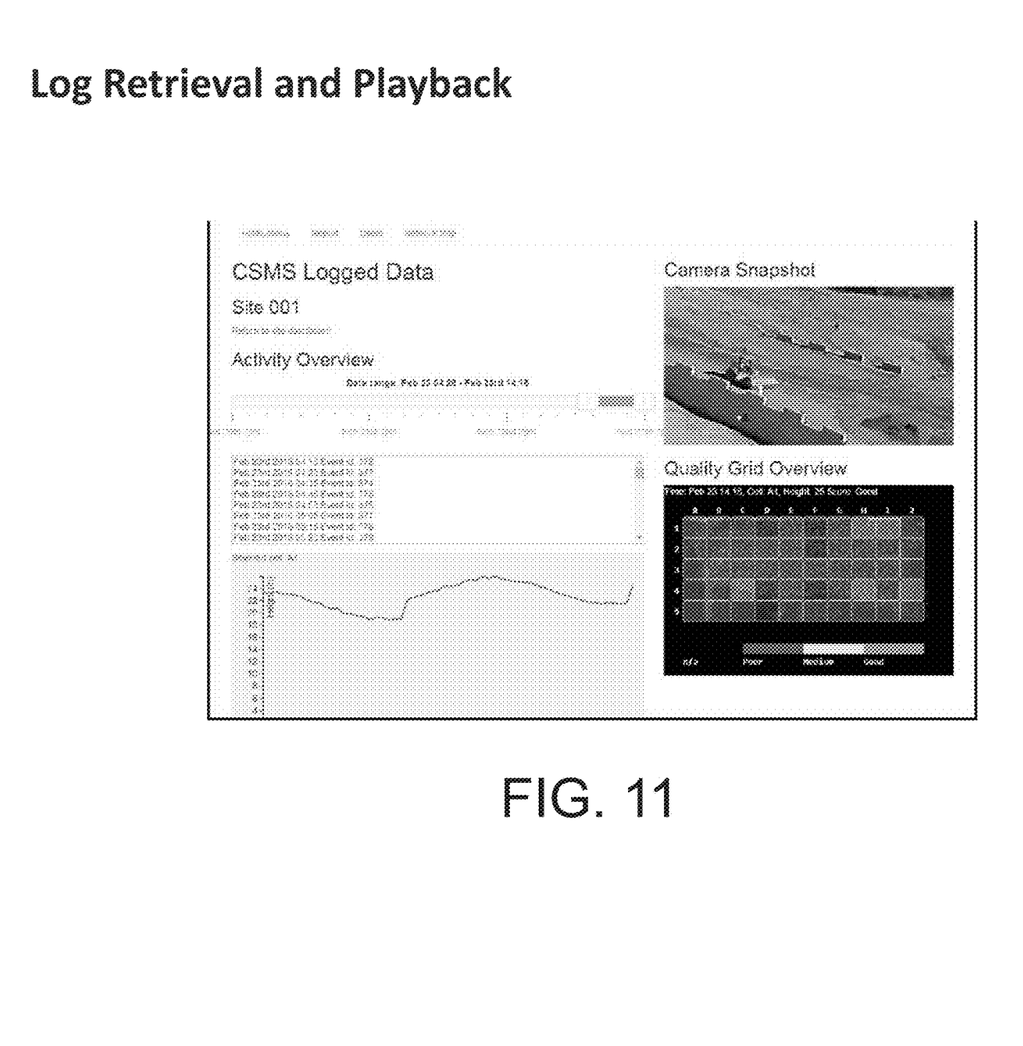
FIG. 11 is a depiction of logged data stored by the processor of the job site monitoring system of the present disclosure.

The job site monitoring system of the present disclosure allows a client to access archived or logged data over the entire course of the construction work at the job site, as shown in the dashboard screen depicted in FIG. 11.

The construction site monitoring system disclosed herein has several capabilities.

1) MSE Wall Backfill Change Detection/Notification

Measure change in height over a specified area of fill dirt behind MSE walls, compare to applicable standards and notify clients, inspectors or stakeholders of noncompliance. Each MSE wall case is identified and monitored independently. The associated area of backfill measured behind each wall would be the width of the wall case multiplied by the known strip length at the current height of the wall. The average height of this area is measured by the 3D scanner and compared to the standard. If the change in height from one compaction event to the next is outside the standard, plus a given tolerance, then the system will automatically notify the stakeholders of this noncompliance and provide an image with the area of interest outlined and named. This insures backfill is dense enough to correctly support the road above and provides the MSE Wall System enough weight and consequently enough friction force on the MSE wall straps to keep the wall panels plum.

2) Plum Walls

Measures angle of walls and individual panels and notifies stakeholders if wall is off plum.

3) Volume of Fill Dirt Loads

Calculates the volume of fill dirt loads received and compares the calculated value to quantity ordered and notify stakeholders of discrepancies in quantities.

4) Quality/Consistency of Fill Dirt

Ability to determine quality of fill dirt by using ranges of reflectivity to identify different materials. If the mix of fill dirt is relatively consistent, then the sensor 15 should sense a smaller range of reflectivity than it would if the fill dirt contains a larger mix of materials (ex. large amounts of concrete, stone, etc.). The processor 22 can thus be configured to evaluate the data points based on reflectivity standards for the backfill material specifications.

5) GPS & Remote Activation

The integrated GPS data allows the client to overlay the scanner position on a map and have the stakeholders tap into any scanner at any jobsite at any time. The software and the processor 22 may be configured to permit remote activation of a scan in cases where the subsystem 10 is not always operating.

6) 3D Model Generation & Time Lapsed 3D Jobsite Images

Each time the system scans the jobsite it takes generates a point cloud data set or 3D model of the job site and sends it to a common server. Data from multiple scanners at a single job site can be overlaid by an on-site processor 22 or an off-site processor to compile a complete 3D snapshot of the jobsite. Each 3D snapshot can be used as a "frame" in an animation to show the progression of construction over time.

7) Off the Grid

The site monitoring system's low power consumption will allow it to be powered by solar energy.

8) Target Identification

The scanner 15 and processor 22 can be capable of importing object parameters indicative of the physical configuration of the object, such as an MSE Panel, MSE Strap, Rebar, Semi Truck, Dump Truck, Construction Workers, etc. The subsystem can compare point cloud data to "identify" objects within the field of view. The identified objects could be counted and associated with the time stamped scan. This allows the client to monitor delivery quantities and timing, workers and worker placement. This should be relatively easy to accomplish because of the accuracy of the 3D laser and consistency of objects seen at the jobsite.

9) Target Tracking

Target tracking can be achieved if the 3D scanner is continuously scanning.

10) Augmented Reality—Plan Vs. Reality

An augmented reality application could compare previously generated 3D CAD drawings of the planned finished project or of different phases of the project and compare the data to point cloud data collected by the 3D scanner 15 and processor 22. The client can then walk through the jobsite and "view" the conformance to the design. This also allows the user/users to accurately visualize/measure the conformance of the work at different phases of the project as a 3D model in the field rather than looking at multiple 2D plan views.

11) Augmented Reality—Pre-Construction

An augmented reality application could incorporate 3D CAD drawings of the planned finished project and overlay the 3D model to the point cloud data collected by the 3D scanner. The user could then walk through the jobsite with any GPS/camera enabled device and "view" finished design over the image taken in by their camera. This allows the user to identify obstructions/complications which might have been overlooked before construction begins, avoiding costly delays. This also allows the user to accurately Visualize/measure the end product as a 3D model in the field rather than looking at multiple 2D plan views. The construction site monitoring system includes x core components.

The construction site monitoring system disclosed herein is a versatile system designed to monitor all types of construction, including but not limited to: commercial/residential/industrial building construction; highways, ramps and bridges; and agricultural. The system measures all parameters of the jobsite, at every stage, and compares dimensions to known construction plans. Below is a list of steps outlining the sequence of events that would take place on a sample job site using the monitoring system disclosed herein.

Taking the dimensions of the final construction build in mind, the system operator finds a vantage point for the system to provide a desirable reflectivity operating range with minimal blind spots. Multiple scanners may be installed as needed to avoid blind spots, with the scanners 15 installed at different vantage points. The multiple scanners communicate with a common processor and the processor executes software adapted to combine and correlate the data from each of the scanners to form a complete 3D rendition of the entire job site.

The newly installed system is tested by and an initial scan is conducted to provide baseline point cloud data of the job site before construction begins for future comparison. The cloud data includes the global location of the job site monitoring system and each subsystem so that subsequent clients can access a specific system or subsystem from multiple systems being monitored.

A CAD Model of the completed job or completed job phase can be overlaid on the initial scan to provide future locations and dimensions of all parameters of the jobsite.

From the overlaid model, all objects are identified by the system into individual zones/stations. These zones/stations are individually named and organized in a method familiar to the contractor in a catalog with each individual objects dimensions and location Tolerances and specifications for each object in the catalog are set.

Applicable standards are uploaded to the processor and attached to associated objects in the catalog for reference.

Scheduled scans are set for beginning and end of every day. This is to make sure regular scans will always capture progress on the jobsite if there are communication/service issues between the contractor and the system.

The contractor is instructed to log in to the system with a phone/tablet. The contractor is provided with a unique username and password and granted limited access to the system scanner controls. The contractor is also allowed access to the catalog, plan views, and applicable standards for reference.

The contractor is instructed to initiate an additional scan before and after each step of the process.

When the contractor initiates this additional scan, they will select which object in the plans they are about to work on out of the catalog of objects—for instance a particular leg of an MSE wall construction. This allows the system to easily monitor multiple processes and associate beginning/end scans of multiple objects by the unique object/process name selected by the contractor.

Each time the system scans the jobsite it creates and records a point cloud data set and panoramic picture.

Any change in the specified zones, outside the tolerance set, triggers a message to stakeholders, identifying which zones are outside of the tolerance and by how much. This message will also include the panoramic picture with the zone highlighted and the associated change in height.

All scan data is saved on the onsite computer hard drive and uploaded to a shared network to be viewed remotely. Different levels of access are granted to different stakeholders. For example, contractors are not allowed to cancel beginning/end of day scans, or control any scanner settings.

At the end of the project, all data sets and panoramic pictures are compiled and presented in the order they were received. This will show the progress over time on the jobsite, identifying each time an object/process was constructed/altered and prove the contractor followed applicable standards and the end result meets specification.

The present disclosure should be considered as illustrative and not restrictive in character. It is understood that only certain embodiments have been presented and that all changes, modifications and further applications that come within the spirit of the disclosure are desired to be protected.

What is claimed is:

1. A system for monitoring a construction job site comprising:
   at least one tower positionable at a job site;
   at least one scanner configured to continuously emit a scanning beam, receive a beam reflected from at least one object and generate a signal indicative of a property of the reflected beam, wherein the at least one scanner is mounted on a corresponding one of the at least one tower in a position above the job site, the at least one scanner operable to generate a scan pattern over all or a portion of the job site, and wherein the at least one object includes backfill material being added to the job site and at least one scanner is positioned to scan backfill;
   a processor in communication with the at least one scanner to receive the continuous signal generated by the scanner, the processor configured to execute software instructions to;
   continuously determine the height of the back fill based on the signal received from the at least one scanner;
   determine when the height of the back fill is substantially uniform;
   compare the back fill height to a predetermined specification;
   generate an alert when the back fill height is outside the specification; and
   send the alert to a client or stakeholder.

2. The system for monitoring a construction job site of claim 1, wherein:
   the back fill height is a loose fill height or a compacted height; and
   the specification is for the corresponding loose fill or compacted height.

3. The system for monitoring a construction job site of claim 1, further comprising a surveillance video camera having a field of view coinciding with the scan pattern of the at least one scanner.

4. The system for monitoring a construction job site of claim 1, further comprising a GPS antenna, wherein the processor executes software instructions to determine the global location of each of the at least one scanner as well as for the construction job site being monitored.

5. The system for monitoring a construction job site of claim 1, further comprising at least one wireless communication modem connected to said processor and operable to transmit data from said processor, including said alert.

6. The system for monitoring a construction job site of claim 5, wherein the at least wireless communication is a cellular modem or a WiFi modem.

7. The system for monitoring a construction job site of claim 1, further comprising a solar panel power supply providing power to said at least one sensor.

8. The system for monitoring a construction job site of claim 1, wherein:
   the at least one object includes a mechanically stabilized earth (MSE) retaining wall;
   the at least one scanner is configured to provide 3D data indicative of the geometry of the retaining wall; and
   the processor is configured to execute software instructions to compare the 3D data with a 3D model of the retaining wall to determine errors in the geometry of the retaining wall.

9. The system for monitoring a construction job site of claim 1, wherein the processor is configured to execute software instructions for object recognition.

* * * * *